United States Patent
Song et al.

(10) Patent No.: US 9,794,756 B2
(45) Date of Patent: Oct. 17, 2017

(54) METHOD AND APPARATUS FOR RECEIVING BROADCAST DATA IN WIRELESS COMMUNICATION SYSTEM

(71) Applicant: Samsung Electronics Co., Ltd., Suwon-si, Gyeonggi-do (KR)

(72) Inventors: Junhyuk Song, Anyang-si (KR); Jeongsik Dong, Yongin-si (KR); Daejoong Kim, Yongin-si (KR); Hyungtaig Lim, Suwon-si (KR); Jaijin Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 20 days.

(21) Appl. No.: 14/694,532

(22) Filed: Apr. 23, 2015

(65) Prior Publication Data

US 2015/0312726 A1  Oct. 29, 2015

Related U.S. Application Data

(60) Provisional application No. 61/983,172, filed on Apr. 23, 2014.

(30) Foreign Application Priority Data

Aug. 8, 2014 (KR) .................. 10-2014-0102437

(51) Int. Cl.
*H04W 4/06* (2009.01)
*H04L 29/06* (2006.01)
*H04W 4/00* (2009.01)

(52) U.S. Cl.
CPC .......... *H04W 4/06* (2013.01); *H04L 65/4076* (2013.01); *H04W 4/001* (2013.01)

(58) Field of Classification Search
CPC ...... H04W 4/001; H04W 4/06; H04L 65/4076
See application file for complete search history.

(56) References Cited

U.S. PATENT DOCUMENTS

| | | | | |
|---|---|---|---|---|
| 2012/0294220 A1* | 11/2012 | Gou | ...................... | H04W 36/00 370/312 |
| 2013/0044670 A1* | 2/2013 | Jang | ........................ | H04W 4/06 370/312 |
| 2013/0163569 A1* | 6/2013 | Lee | ........................ | H04L 1/0045 370/336 |
| 2013/0229974 A1* | 9/2013 | Xu | ........................... | H04W 4/06 370/312 |
| 2013/0294318 A1* | 11/2013 | Amerga | .................. | H04W 4/06 370/312 |
| 2013/0336173 A1 | 12/2013 | Mandil et al. | | |
| 2014/0036676 A1* | 2/2014 | Purnadi | ............ | H04W 36/0055 370/235 |
| 2014/0140237 A1* | 5/2014 | Ma | ........................ | H04W 24/08 370/252 |
| 2014/0161020 A1* | 6/2014 | Jung | ..................... | H04W 48/20 370/312 |

(Continued)

*Primary Examiner* — Paul H Masur
(74) *Attorney, Agent, or Firm* — Jefferson IP Law, LLP

(57) ABSTRACT

A method and apparatus for transmitting Multimedia Broadcast Multicast Service (MBMS) data for use in a Long Term Evolution (LTE) system is provided. The method includes generating information for use in determining whether a broadcast area changes on inter-cell movement of a terminal, generating a system information block (SIB) including the generated information, and broadcasting the SIM.

22 Claims, 15 Drawing Sheets

(56) References Cited

U.S. PATENT DOCUMENTS

| | | | | |
|---|---|---|---|---|
| 2014/0177506 A1* | 6/2014 | Korus | ...................... | H04W 4/06 370/312 |
| 2014/0269566 A1* | 9/2014 | Wang | ...................... | H04W 4/06 370/329 |
| 2015/0056997 A1* | 2/2015 | Su | ........................ | H04W 36/08 455/436 |
| 2015/0124682 A1* | 5/2015 | Phan | ........................ | H04W 4/06 370/312 |
| 2015/0208379 A1* | 7/2015 | Lin | ........................ | H04W 4/06 370/312 |
| 2015/0327299 A1* | 11/2015 | Koskinen | ................ | H04W 4/06 370/329 |
| 2016/0323784 A1* | 11/2016 | Ma | .................... | H04W 36/0022 |

\* cited by examiner

METHOD AND APPARATUS FOR RECEIVING BROADCAST DATA IN WIRELESS COMMUNICATION SYSTEM

CROSS-REFERENCE TO RELATED APPLICATION(S)

This application claims the benefit under 35 U.S.C. §119(e) of a U.S. Provisional application filed on Apr. 23, 2014 in the U.S. Patent and Trademark Office and assigned Ser. No. 61/983,172, and under 35 U.S.C. §119(a) of a Korean patent application filed on Aug. 8, 2014 in the Korean Intellectual Property Office and assigned Serial number 10-2014-0102437, the entire disclosure of each of which is hereby incorporated by reference.

TECHNICAL FIELD

The present disclosure relates to a wireless communication system. More particularly, the present disclosure relates to a method and apparatus for transmitting Multimedia Broadcast Multicast Service (MBMS) data in a Long Term Evolution (LTE) system.

BACKGROUND

Mobile communication systems were developed to provide the subscribers with voice communication services while on the move. With the rapid advance of technologies, the mobile communication systems have evolved to support high speed data communication services beyond the legacy voice-oriented services. However, the limited resource and user requirements for higher speed services in the current mobile communication system spur the evolution to more advanced mobile communication systems.

As one of the next-generation mobile communication systems to meet such requirements, standardization for a Long Term Evolution (LTE) system is underway in the 3rd Generation Partnership Project (3GPP). LTE is a technology designed to provide high speed packet-based communication of up to 100 Mbps. In order to accomplish the aim, a discussion is being held on several schemes, one scheme for reducing the number of nodes located in a communication path by simplifying a configuration of the network, and another scheme for maximally approximating wireless protocols to wireless channels.

Meanwhile, the data service is characterized in that resources are allocated based on the amount of data to be transmitted and channel state, unlike the voice service. In the wireless communication system such as a cellular mobile communication system, a scheduler manages resource allocation in consideration of the required resource amount, channel condition, and data amount. This holds true even in the LTE system as one of the promising next generation mobile communication standards, and the scheduler implemented in the evolved Node B (eNB) manages transmission resources.

Recently, LTE-Advanced (LTE-A) is under discussion as the evolved version of the LTE system with the combination of several new technologies. Also, the Multimedia Broadcast Multicast Service (MBMS) is improved in LTE-A. The MBMS is a broadcast service provided through the late system.

There is a need for optimizing the service area for MBMS as well as unicast communication and a method for providing the user equipment (UE) with the MBMS seamlessly.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for providing seamless multimedia broadcast multicast service (MBMS).

Another aspect of the present disclosure is to provide a method and apparatus for minimizing broadcast data decoding when the UE moves from one cell to another.

In accordance with an aspect of the present disclosure, an information transmission method of a base station in a wireless communication system is provided. The information transmission method includes generating information for use in determining whether a broadcast area changes due to inter-cell movement of a terminal, generating a system information block including the generated information, and broadcasting the system information block.

In accordance with another aspect of the present disclosure, a broadcast information reception method of a terminal in a wireless communication system is provided. The broadcast reception information includes receiving a System Information Block (SIB) from a new cell to which the terminal moves from an old cell, determining whether a broadcast area changes based on the SIB, and determining whether to decode the broadcast data based on a result of the determination.

In accordance with another aspect of the present disclosure, a base station for transmitting information in a wireless communication system is provided. The base station includes an interface unit configured to transmit and receive signals and a control unit configured to generate information for use in determining whether a broadcast area changes due to inter-cell movement of a terminal, to generate a system information block including the generated information, and to control the interface unit to broadcast the system information block.

In accordance with another aspect of the present disclosure, a terminal for receiving broadcast information in a wireless communication system is provided. The terminal includes a radio communication unit configured to transmit and receive signals to and from a base station and a control unit configured to control the radio communication unit to receive a SIB from a new cell to which the terminal moves from an old cell, to determine whether a broadcast area changes based on the SIB, and to determine whether to decode the broadcast data based on a result of the determination.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
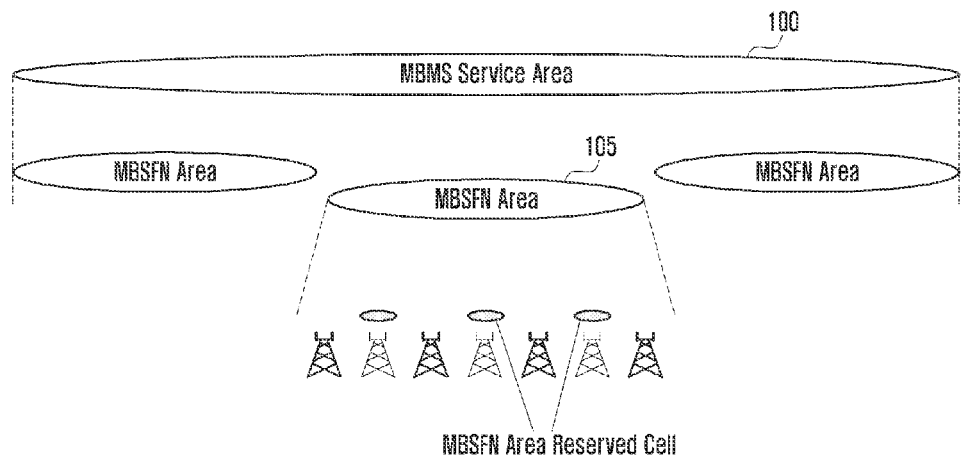
FIG. 1 is a conceptual diagram illustrating the concept of multimedia broadcast multicast service (MBMS) according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some of the elements are exaggerated, omitted or simplified in the drawings and the elements may have sizes and/or shapes different from those shown in drawings, in practice. The same reference numbers are used throughout the drawings to refer to the same or like parts.

Advantages and features of the present disclosure and methods of accomplishing the same may be understood more readily by reference to the following detailed description of various embodiments of the present disclosure and the accompanying drawings. The present disclosure may, however, be embodied in many different forms and should not be construed as being limited to the various embodiments set forth herein. Rather, these various embodiments are provided so that this disclosure will be thorough and complete and will fully convey the concept of the disclosure to those skilled in the art, and the present disclosure will only be defined by the appended claims. Like reference numerals refer to like elements throughout the specification.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a non-transitory computer-readable memory that can direct a computer or other programmable data processing apparatus to function in a particular manner, such that the instructions stored in the non-transitory computer-readable memory produce an article of manufacture including instruction means which implement the function/act specified in the flowchart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide operations for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to the embodiments of the present disclosure, means, but is not limited to, a software or hardware component, such as a Field Programmable Gate Array (FPGA) or Application Specific Integrated Circuit (ASIC), which performs certain tasks. A module may advantageously be configured to reside on a non-transitory addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided in the components and modules may be combined into fewer components and modules or further separated into additional components and modules. In addition, the components and modules may be implemented such that they execute one or more central processing units (CPUs) in a device or a secure multimedia card.

FIG. 1 is a conceptual diagram illustrating the concept of multimedia broadcast multicast service (MBMS) according to an embodiment of the present disclosure.

The MBMS service area 100 is a network area including a plurality of evolved Nodes B (eNBs) capable of performing Multimedia Broadcast Multicast Service Single Frequency Network (MBSFN) transmission.

The MBSFN area 105 (this term is interchangeably used with 'broadcast area information) is a network area including a plurality of cells for MBSFN transmission that are synchronized for MBSFN transmission.

All the cells with the exception of the MBSFN area reserved cells 110 are used for MBSFN transmission. The MBSFN area reserved cells 110 are the cells that are not used for MBSFN transmission but may be used for other purposes and allowed for restricted transmit power on the radio resource allocated for MBSFN transmission.

Figure 2:
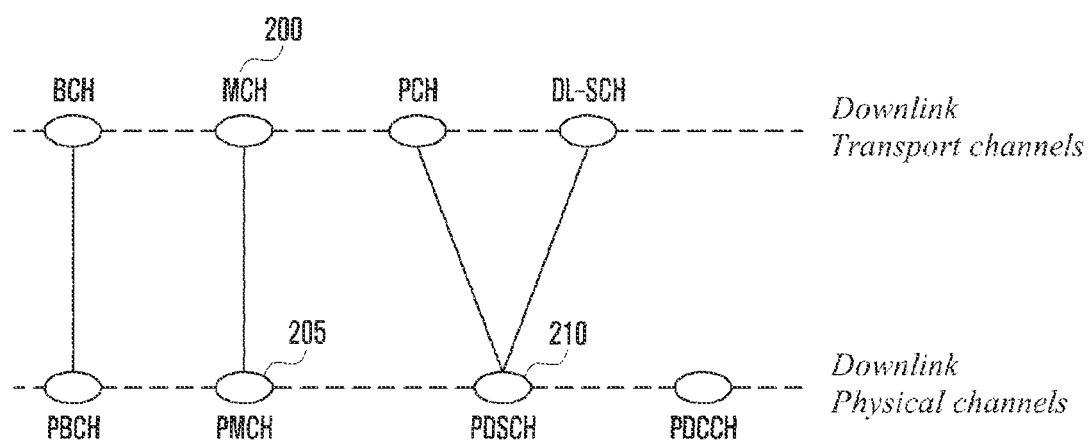
FIG. 2 is a diagram illustrating downlink channel mapping for multimedia broadcast multicast service single frequency network (MBSFN) transmission according to an embodiment of the present disclosure.

FIG. 2 is a diagram illustrating downlink channel mapping for MBSFN transmission according to an embodiment of the present disclosure.

Referring to FIG. 2, the data transferred through the Multicast Channel (MCH) 200 between the Medium Access Control (MAC) layer and the Physical layer, and the MCH is mapped to the Physical Multicast Channel (PMCH) 205.

Typically, the unicast for transmission to a specific UE uses Physical Downlink Shared Channel (PDSCH) 210.

Figure 3:
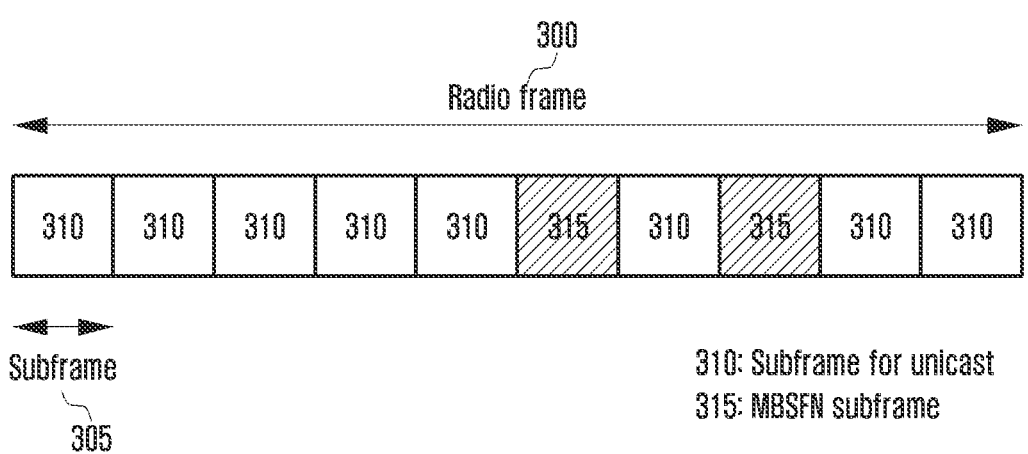
FIG. 3 is a diagram illustrating a structure of a downlink frame for use in an long term evolution (LTE) system according to an embodiment of the present disclosure.

FIG. 3 is a diagram illustrating a structure of a downlink frame for use in a long term evolution (LTE) system according to an embodiment of the present disclosure.

As shown in Referring to FIG. 3, a radio frame 300 includes 10 subframes 305. The subframes include subframes 310 for unicast data transmission and MBSFN subframes 315 for broadcast through MBSFN.

The subframe for unicast and the MBSFN subframe differ from each other in the number of Orthogonal Frequency Division Multiplexing (OFDM) symbols, length of cyclic prefix, structure and number of Cell-specific Reference Signals (CRSs).

In LTE Rel-8 and Rel-9 systems, the MBSFN subframe is used only for the purpose of transmitting broadcast or multicast data. In LTE Rel-10 or later system, however, the MBSFN subframe is used for the purpose of unicast transmission as well as the broadcast and multicast transmission.

In order to use Physical Downlink Shared Channel (PDSCH) efficiently, the user equipments (UEs) are configured with respective Multi-antenna schemes and Transmission Modes (TMs) associated with the Reference Signal (RS).

In LTE Rel-10, there are transmission modes of TM1 to TM9. Each UE is configured in one of the TMs for PDSCH transmission, and TM8 is introduced in Rel-9 and TM9 is introduced in Rel-10.

Here, TM9 supports Single User Multi-Input Multi-Output (SU-MIMO) having up to 8 ranks. TM9 supports multi-layer transmission up to 8 layers using Rel-10 Demodulation Reference Signal (DMRS) in demodulation. Although the Rel-10 DMRS is precoded, it is not necessary to notify the receiver of the corresponding precoder index.

In order to support TM9, Downlink Control Information (DCI) format 2C is newly defined in Rel-10. It is noted that the Rel-10 or earlier UEs do not attempt decoding in MBSFN subframe. Accordingly, if it is required for all UEs to attempt decoding in MBSFN subframe, this means that the old release UEs have to be upgraded.

Among the aforementioned TMs, TM9 is the transmission mode of maximizing the transmission efficiency using multiple antennas. In the present disclosure, if it is required to increase the data throughput of a UE through unicast data reception in MBSFN subframe, the eNB configures TM9 to the UE such that the UE operating in TM9 receives unicast data in MBSFN subframe.

For unicast data transmission, it is necessary to notify of the resource for transmitting data using PDCCH and the data are transmitted through PDSCH in the LTE system. The UE has to determine whether the PDCCH has the information on the resource allocated to the UE before receiving the actual data.

In the meantime, the resource allocation information for MBSFN is acquired through more complex procedure.

The eNB notifies the UE of the transmission position of Multicast Control Channel (MCCH) per MBSFN Area through System Information Block 13 (SIB13) broadcast. The MCCH includes resource allocation information for MBSFN such that the UE decodes the MCCH to check the transmission position of MBSFN subframe.

As described above, the reason for providing the MBMS resource allocation information through a method different from the related-art unicast is that the MBMS has to be provided to even the UE in the idle mode. Accordingly, the transmission position of MCCH as a control channel is notified using the SIB13 broadcast. The overall procedure of receiving MBMS is described with reference to FIG. 4.

Figure 4:
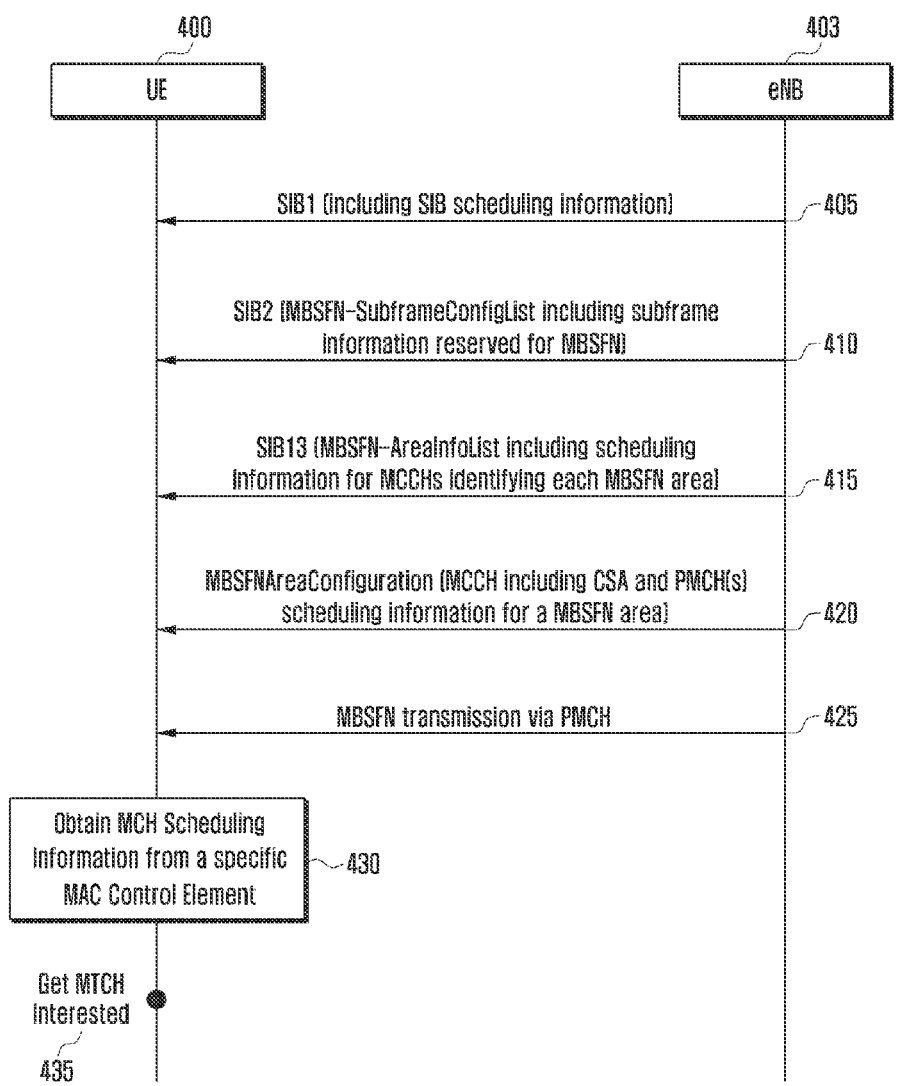
FIG. 4 is a signal flow diagram illustrating a MBSFN reception procedure of the user equipment (UE) according to an embodiment of the present disclosure.

FIG. 4 is a signal flow diagram illustrating a MBSFN reception procedure of the UE according to an embodiment of the present disclosure.

The UE 400 receives SIB1 from the eNB 403 at operation 405. The SIB1 includes scheduling information for other SIBs. Accordingly, the UE has to receive SIB1 in advance for receiving other SIBs.

The UE 400 receives SIB2 from the eNB 403 at operation 410. The MBSFN-SubframeConfigList IE of the SIB2 indicates the subframes that can be used for MBSFN transmission.

The MBSFN-SubframeConfigList information element (IE) includes a MBSFN-SubframeConfig IE indicating potential MBSFN subframes among the subframes constituting the radio frame. Table 1 shows a configuration of the MBSFN-SubframeConfig IE.

TABLE 1

-- ASN1START
MBSFN-SubframeConfig ::=      SEQUENCE {
    radioframeAllocationPeriod        ENUMERATED {n1, n2,
n4, n8, n16, n32}, TABLE 1-continued

```
    radioframeAllocationOffset    INTEGER (0..7),
    subframeAllocation            CHOICE {
        oneFrame                      BIT
STRING (SIZE(6)),
        fourFrames                    BIT
STRING (SIZE(24))
    }
}
-- ASN1STOP
```

Here, the radio frame allocation period (radioFrameAllocationPeriod) and radio frame allocation offset (radioFrameAllocationOffset) are used for indicating the radio frame having a MBSFN subframe, and the radio frame fulfilling equation "SFN mod radioFrameAllocationPeriod=radioFrameAllocationOffset" includes MBSFN subframes.

System Frame Number (SFN) indicates the number of the radio frame. This repeats in the range from 0 to 1023.

The subframe allocation (subframeAllocation) indicates the MBSFN subframes in the radio frame indicated by the equation.

The indication may be done by one or four radio frames. In the case of using the unit of one radio frame, oneFrame IE indicates the subframe. Among the ten subframes of one radio frame, the 1st, 2nd, 3rd, 6th, 7th, and 8th subframes may be configured as MBSFN subframes. Accordingly, the oneFrame IE indicates the MBSFN subframe among the enumerated subframes using 6 bits.

In the case of using the unit of four radio frames, the fourFrames IE indicates the MBSFN subframes. In order to cover four radio frames, a total of 24 bits are used to indicate MBSFN subframes among the enumerated subframes of every radio frame. Accordingly, the UE is capable of checking the subframe that may be configured as MBSFN subframes precisely.

If the UE 400 wants to receive MBSFN data, it receives SIB13 broadcast by the eNB 403 at operation 415. The MBSFN-AreaList IE of the SIB13 including position information on MCCH transmission per MBSFN area of the cell such that the UE receives MCCH based on this information at operation 420.

Table 2 shows a structure of the MBSFN-AreaInfoList IE.

Each MBSFN area has MCCH corresponding thereto, and the MBSFN-AreaInfoList IE includes MCCH scheduling information for all the MBSFN areas. The MBSFN-AreaInfo IE is an MBSFN area ID. The Non-MBSFNregionLength indicates a number of symbols corresponding to the non-MB SFN area among the symbols constituting the MBSFN subframe. These symbols are located at the beginning of the subframe. The notificationIndicator is used to indicate a PDCCH bit notifying of change of the MCCH information. The Mcch-Config IE contains the MCCH scheduling information. The Mcch-RepetitionPeriod and mcch-Offset are used to indicate the position of the frame including the MCCH. The Mcch-ModificationPeriod is the MCCH transmission period, and sf-AllocInfo indicates the location of the subframe including MCCH in the frame carrying the MCCH. The signallingMCS indicates the Modulation and Coding Scheme (MCS) applied to the subframe indicated by the sf-AllocInfo and (P)MCH.

TABLE 2

```
-- ASN1START
MBSFN-AreaInfoList-r9 ::=          SEQUENCE
(SIZE(1..maxMBSFN-Area)) OF MBSFN-AreaInfo-r9
MBSFN-AreaInfo-r9 ::=              SEQUENCE {
    mbsfn-AreaId-r9                    INTEGER
(0..255),
    non-MBSFNregionLength          ENUMERATED    {s1,
s2},
    notificationIndicator-r9           INTEGER (0..7),
    mcch-Config-r9                     SEQUENCE {
        mcch-RepetitionPeriod-r9       ENUMERATED    {rf32,
rf64, rf128, rf256},
        mcch-Offset-r9                 INTEGER
(0..10),
        mcch-ModificationPeriod-r9     ENUMERATED
{rf512, rf1024},
        sf-AllocInfo-r9                BIT
STRING (SIZE(6)),
        signallingMCS-r9
{n2,n7,n13,n19}                    ENUMERATED
    },
    ...
}
```

The MBSFNAreaConfiguration IE indicates the location of the resource for use in MBSFN transmission, and the UE receives the MBSFN subframe based on this information at operation 425. The commonSF-AllocPeriod is the repetition period of the subframes indicated by the commonSF-Alloc.

The Pmch-InfoList IE includes entire PMCH configuration information of MBSFN area.

TABLE 3

```
-- ASN1START
MBSFNAreaConfiguration-r9 ::=      SEQUENCE {
    commonSF-Alloc-r9                              CommonSF-
AllocPatternList-r9,
    commonSF-AllocPeriod-r9                  ENUMERATED {
rf4, rf8, rf16, rf32, rf64, rf128, rf256},
    pmch-InfoList-r9                         PMCH-InfoList-r9,
    nonCriticalExtension
    MBSFNAreaConfiguration-v930-IEs          OPTIONAL
}
MBSFNAreaConfiguration-v930-IEs ::= SEQUENCE {
    lateNonCriticalExtension           OCTET STRING
                        OPTIONAL, -- Need OP
    nonCriticalExtension                  SEQUENCE { }
                                   OPTIONAL,  -- Need OP
}
CommonSF-AllocPatternList-r9 ::=   SEQUENCE   (SIZE   (1..maxMBSFN-
Allocations)) OF MBSFN-SubframeConfig
-- ASN1STOP
```

The UE determines the locations of the MBSFN subframes carrying the intended MTCH from the MCH scheduling information MAC CE at operation 430. The UE decodes the MTCH using the MCH scheduling information at operation 435.

Figure 5:
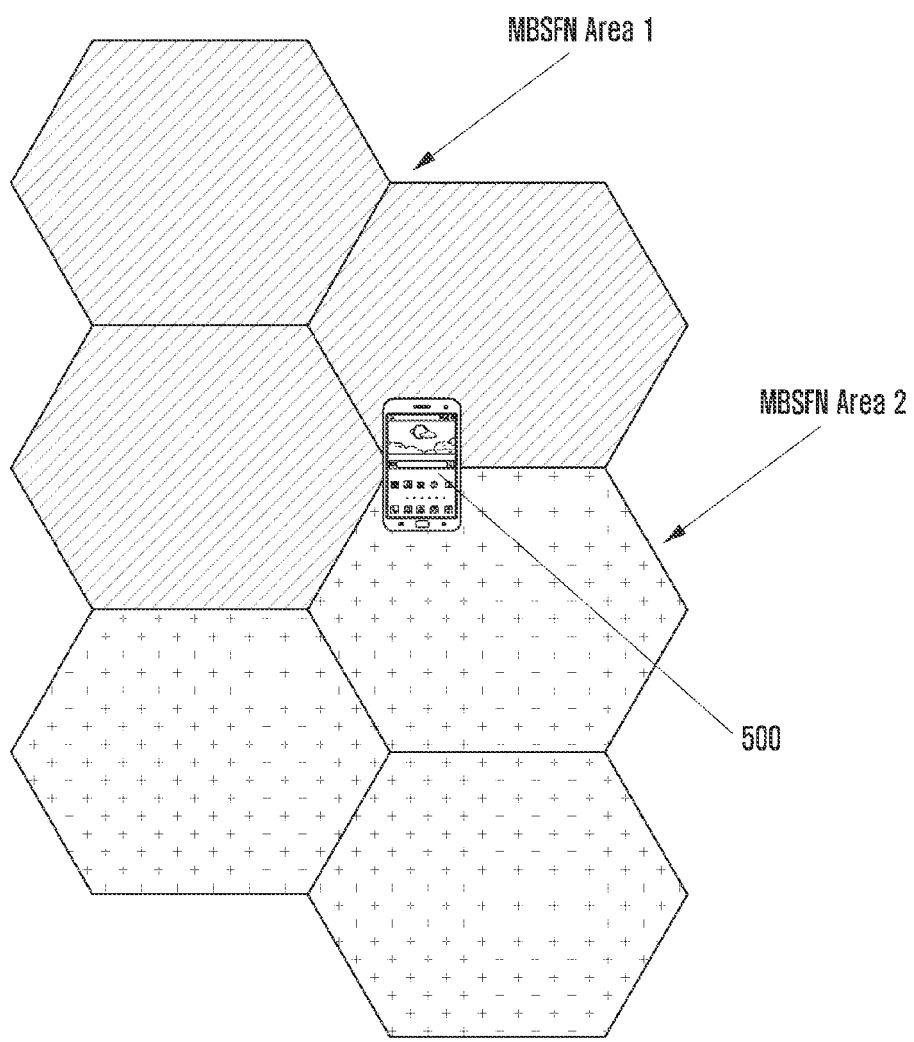
FIG. 5 is a diagram for explaining problems occurring in inter-cell movement of a UE according to an embodiment of the present disclosure.

FIG. 5 is a diagram for explaining problems occurring in inter-cell movement of a UE according to an embodiment of the present disclosure.

When an (e)MBMS-enabled UE 500 moves from one cell to another (i.e., a cell change), a problem may occur in that the UE cannot decode but buffer data received on the PMCH before receiving the MBSFN area information included in the SIB 13 message defined in the standard. That is, when the UE moves one cell to another, the broadcast playback is likely to be delayed until the UE receives the SIB 13 message and determines whether the broadcast area information of the moved cell matches the broadcast area information of the previous cell.

The present disclosure has been made in an effort to address this problem and provides a method and apparatus for minimizing the delay of decoding the broadcast data especially when the UE moves from one cell to another.

A description is made of the first embodiment of the present disclosure.

According to the first embodiment of the present disclosure, the eNB may configure the transmission period of SIB 13 including MBSFN area information in association with the transmission period of SIB 2. For example, the eNB may configure the transmission period of SIB 13 to be equal to the transmission period of SIB 2.

In an alternative embodiment of the present disclosure, the eNB may set the transmission period of SIB 13 to 80 ms which is the shortest among the SIB transmission periods.

According to this embodiment of the present disclosure, when the UE moves from one cell to another, it receives the SIB 13 and the SIB 2 simultaneously or SIB 13 first and then the SIB 2 to check the MBSFN area information of the new cell quickly. Accordingly, the UE can check whether the MBSFN area has changed quickly as compared to the related-art method so as to solve the broadcast data buffering problem.

Figure 6:
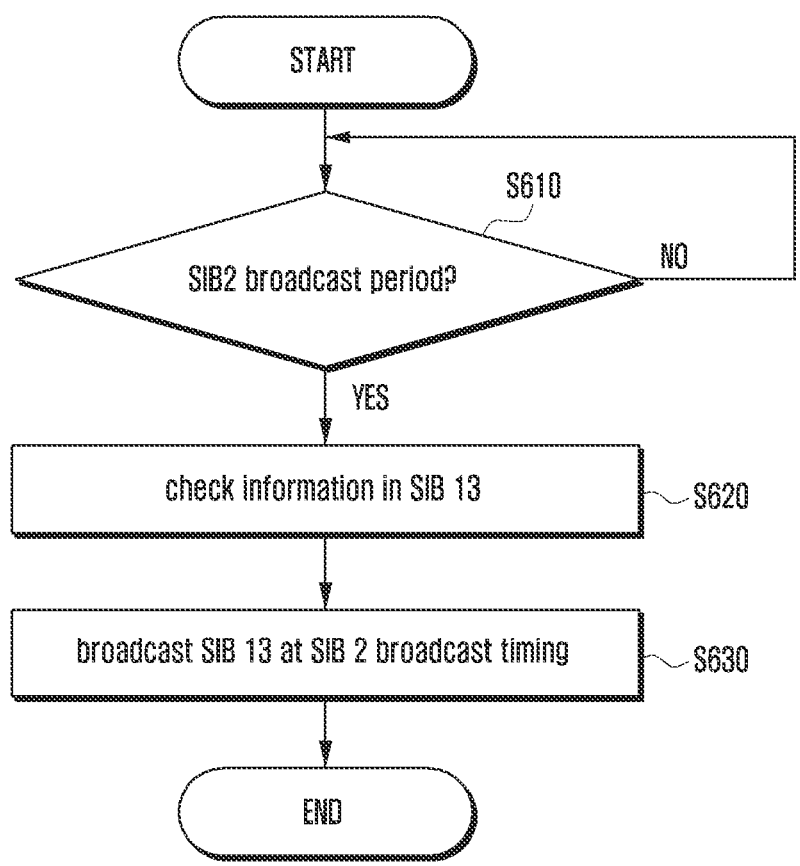
FIG. 6 is a flowchart illustrating a broadcast procedure of an evolved Node B (eNB) according to the first embodiment of the present disclosure.

FIG. 6 is a flowchart illustrating a broadcast procedure of an eNB according to the first embodiment of the present disclosure.

The eNB first determines whether it is a period (or time) of broadcasting SIB 2 at operation S610. If it is not the period of broadcasting SIB 2, the eNB may perform a normal operation.

If it is the period of broadcasting SIB 2, the eNB checks the information included in the SIB 13 at operation S620. The SIB 13 may include the information on the MBSFN area.

Next, the eNB broadcasts the SIB 13 according to the SIB 2 broadcast timing at operation S630.

Although FIG. 6 is directed to the case where the SIB 13 is broadcast according to the broadcast period of the SIB 2, the present disclosure is not limited thereto. For example, the broadcast period of the SIB 13 may be shorter than that of the SIB 2 or the shortest among the broadcast periods of all SIBs.

Figure 7:
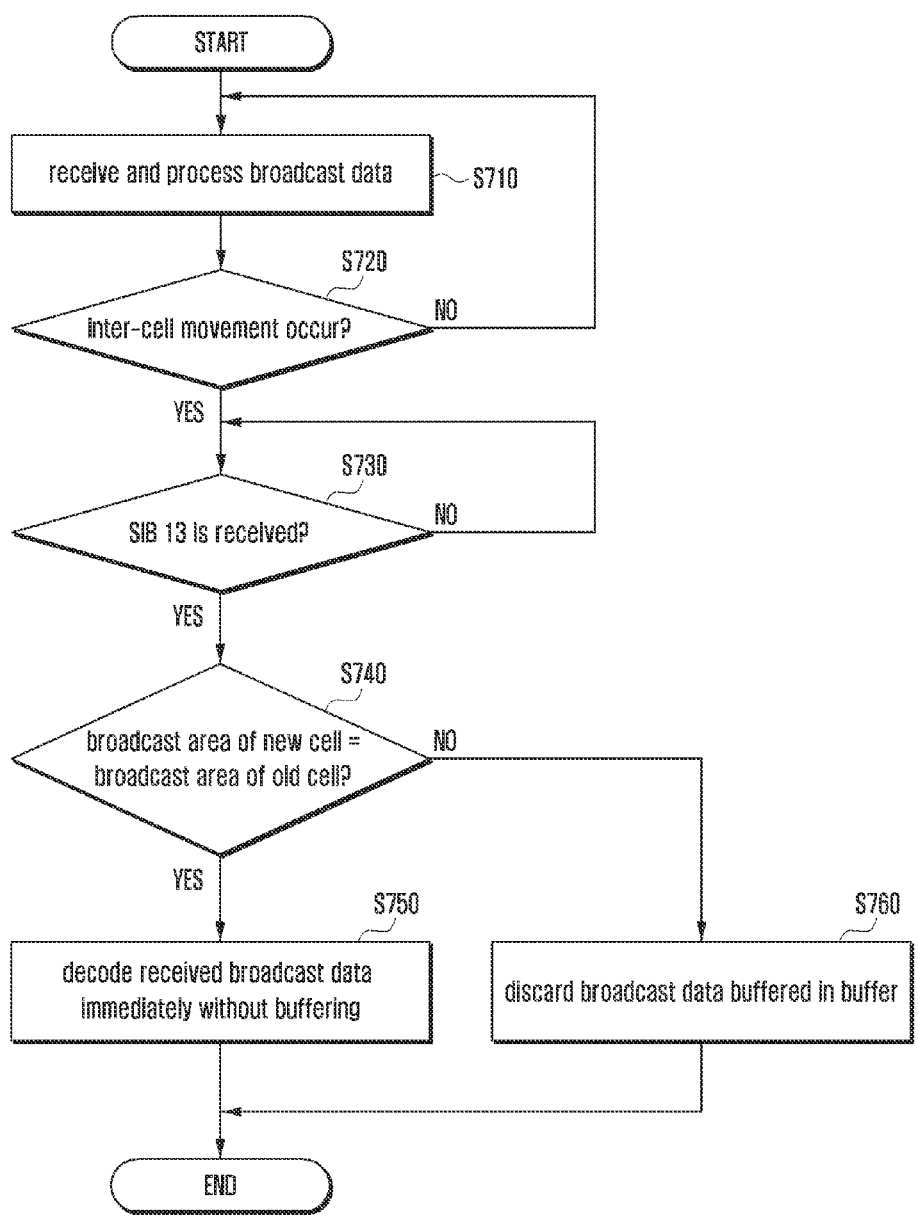
FIG. 7 is a flowchart illustrating a broadcast data handling procedure of a UE according to the first embodiment of the present disclosure.

FIG. 7 is a flowchart illustrating a broadcast data handling procedure of a UE according to the first embodiment of the present disclosure.

The UE receives and decodes broadcast data to display the decoding result to the user at operation S710.

The UE determines whether inter-cell movement has occurred at operation S720. For this purpose, the UE may determine whether handover has been performed or cell selection/reselection has been performed.

If no inter-cell movement has occurred, the UE returns the procedure to operation S710 to continue the procedure.

Otherwise if the inter-cell movement has occurred, the UE determines whether the SIB 13 is received at operation S730. According to an embodiment of the present disclosure, since the SIB 13 is broadcast at a period equal to or shorter than that of the SIB 2, the UE can acquire the SIB 13 quickly even when it moves from one cell to another.

If the SIB 13 is received, the UE determines whether the broadcast area information of the previous cell is identical with that of the current cell at operation S740. If the broadcast area informations are identical with each other, the UE decodes the broadcast data immediately without buffering at operation S750.

If the broadcast area information is not identical with each other, the UE discards the broadcast data buffered in the buffer at operation S760. Afterward, the UE may prepare for receiving the broadcast data in the new broadcast area. Since the preparation process is out of the scope of the present disclosure, detailed description thereof is omitted herein.

The second embodiment of the present disclosure is described hereinafter.

In the second embodiment of the present disclosure, the broadcast area information (MBSFN-AreaId-r9 is added) is added to the SIB 2 MBSFN subframe information (MBSFN-SubframeConfig) transmitted by the eNB as shown in Table 4. Then the UE which moves from the old cell to the new cell receives the SIB 2 broadcast by the new cell and determines whether the MBSFN area changes based on the SIB 2.

TABLE 4

| | |
|---|---|
| MBSFN-SubframeConfigList ::= | SEQUENCE (SIZE (1..maxMBSFN-Allocations)) OF MBSFN-SubframeConfig |
| -- ASN1 START | |
| MBSFN-SubframeConfig ::= | SEQUENCE { |
|     MBSFN-AreaId-r9 | Integer (0..255) |
|     radioframeAllocationPeriod | ENUMERATED {n1, n2, n4, n8, n16, n32}, |
|     radioframeAllocationOffset | INTEGER (0..7), |
|     subframeAllocation | CHOICE { |
|         oneFrame | BIT STRING (SIZE(6)), |
|         fourFrames | BIT STRING (SIZE(24)) |
|     } | |
| } | |
| -- ASN1STOP | |

Figure 8:
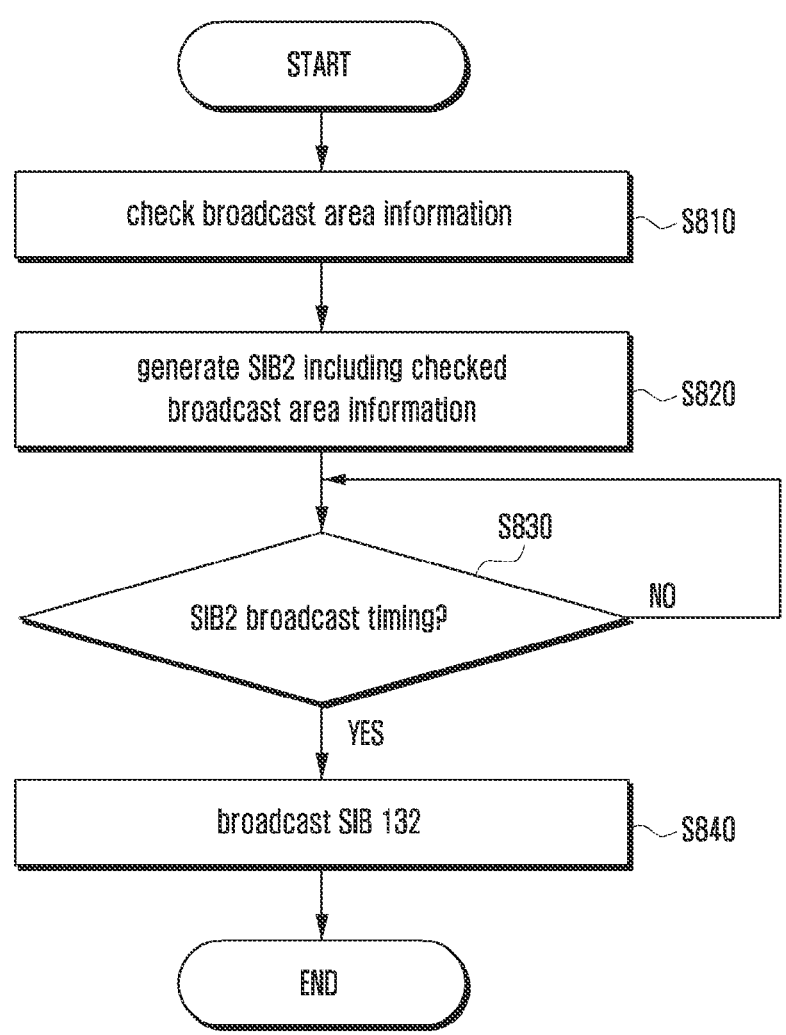
FIG. 8 is a flowchart illustrating a broadcast procedure of an eNB according to the second embodiment of the present disclosure.

FIG. 8 is a flowchart illustrating a broadcast procedure of an eNB according to the second embodiment of the present disclosure.

The eNB checks the broadcast area information at operation S810. Then the eNB generates SIB 2 including the checked broadcast area information at operation S820.

The eNB determines whether it is timing of broadcasting SIB 2 at operation S830. If it is not the timing of broadcasting SIB 2, the eNB waits until the SIB 2 broadcast timing arrives.

If it is the timing of broadcasting SIB 2, the eNB broadcasts the SIB 2 at operation S840. The broadcast period of SIB 2 is shorter than that of SIB 13 and includes the MBSFN-AreaId-r9, the UE can determines whether the broadcast area has changed quickly based on the SIB 2.

Figure 9:
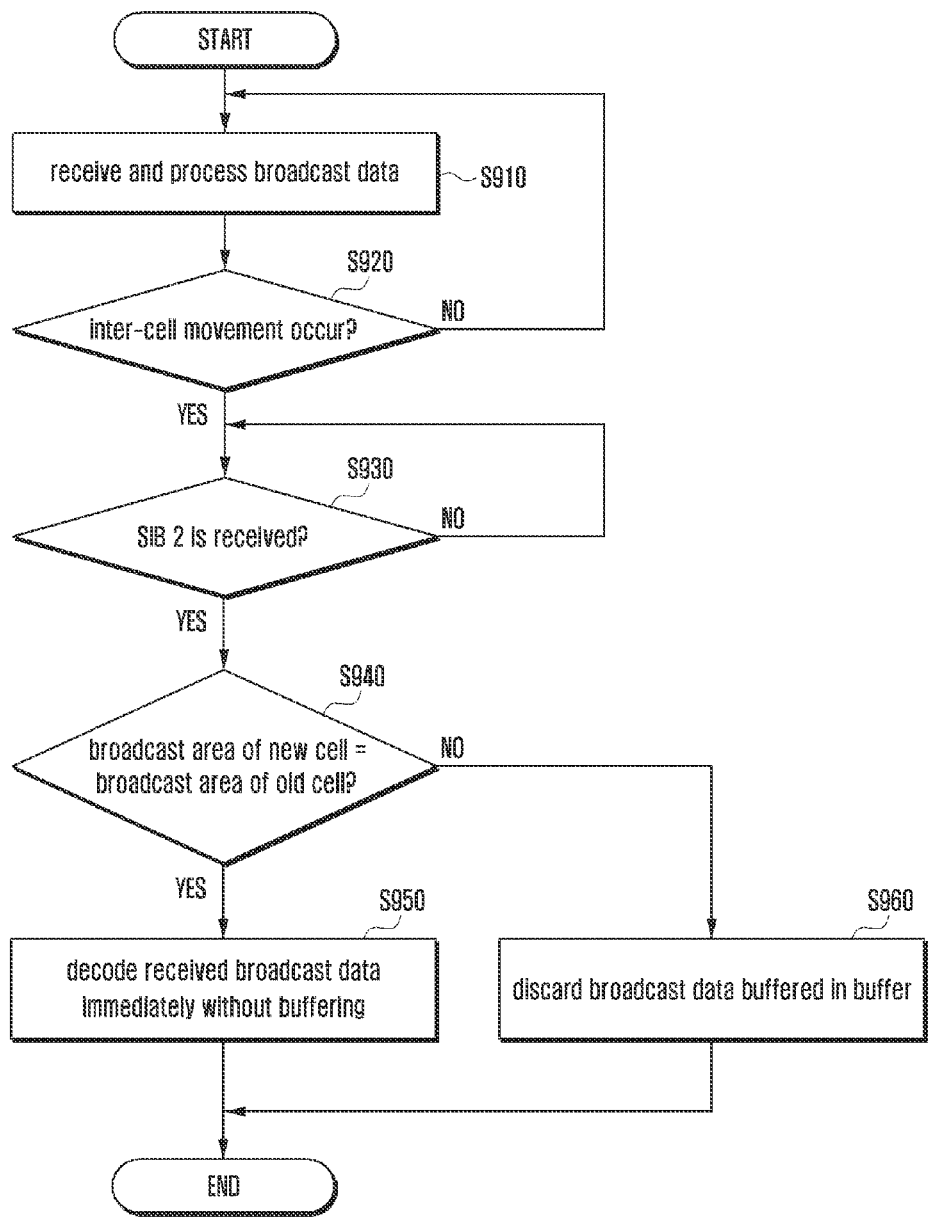
FIG. 9 is a broadcast data handling procedure of the UE according to the second embodiment of the present disclosure.

FIG. 9 is a broadcast data handling procedure of the UE according to the second embodiment of the present disclosure.

The UE receives and decodes broadcast data to display the decoding result to the user at operation S910.

The UE determines whether inter-cell movement has occurred at operation S920. If no inter-cell movement has occurred, the UE returns the procedure to operation S910 to continue the procedure.

If the inter-cell movement has occurred, the UE determines whether SIB 2 is received at operation S930. According to an embodiment of the present disclosure, since the SIB 2 includes the broadcast area information, the UE which has moved from the old cell to a new cell can determine whether the broadcast area has changed quickly even before receiving SIB 13.

For this purpose, if the SIB 2 is received, the UE determines whether the broadcast area information of the new cell is identical with that of the old cell at operation S940. If the broadcast area informations are identical with each other, the UE decodes the broadcast data immediately without buffering at operation S950.

If the broadcast area informations are not identical with each other, the UE discards the broadcast data buffered in the buffer at operation S960. Afterward, the UE may prepare for receiving the data broadcast in the new broadcast area. Since the preparation process is out of the scope of the present disclosure, detailed description thereof is omitted herein.

The third embodiment of the present disclosure is described hereinafter.

In the third embodiment of the present disclosure, an MBSFN area change indication flag is defined as shown in Table 6. The MBSFN area change indication flag is included in the neighbor cell list and is set for respective neighbor cell of a certain cell. The relationship between the neighbor cell list and MBSFN area change indication flag can be exemplified as shown in Table 5.

TABLE 5

| Neighbor cell list | Neighbor cell 0 | Physical cell identifier<br>q-offset cell<br>broadcast area information change indication information |
|---|---|---|
| | Neighbor cell 1 | Physical cell identifier<br>q-offset cell<br>broadcast area information change indication information |

The eNB broadcasts the system information, i.e., SIB 4, including the MBSFN area change indication flag.

If the UE which has moved from one cell to another receives SIB 4, it determines whether the cell area has changed based on the MBSFN area change indication flag.

TABLE 6

```
-- ASN1START
SystemInformationBlockType4 ::=        SEQUENCE {
    intraFreqNeighCellList              IntraFreqNeighCellList
                OPTIONAL, -- Need OR
    intraFreqBlackCellList              IntraFreqBlackCellList
                OPTIONAL, -- Need OR
    csg-PhysCellIdRange                 PhysCellIdRange
                OPTIONAL, -- Cond CSG
    ...,
    lateNonCriticalExtension            OCTET STRING
                OPTIONAL
}
IntraFreqNeighCellList ::= SEQUENCE    (SIZE    (1..maxCellIntra))
OF IntraFreqNeighCellInfo
IntraFreqNeighCellInfo ::=  SEQUENCE {
    physCellId                                      PhysCellId,
    q-OffsetCell                                    Q-OffsetRange,
    MBSFNChangeIndicator        BOOLEAN
    ...
}
IntraFreqBlackCellList ::= SEQUENCE    (SIZE    (1..maxCellBlack))
OF PhysCellIdRange
-- ASN1STOP
```

Figure 10:
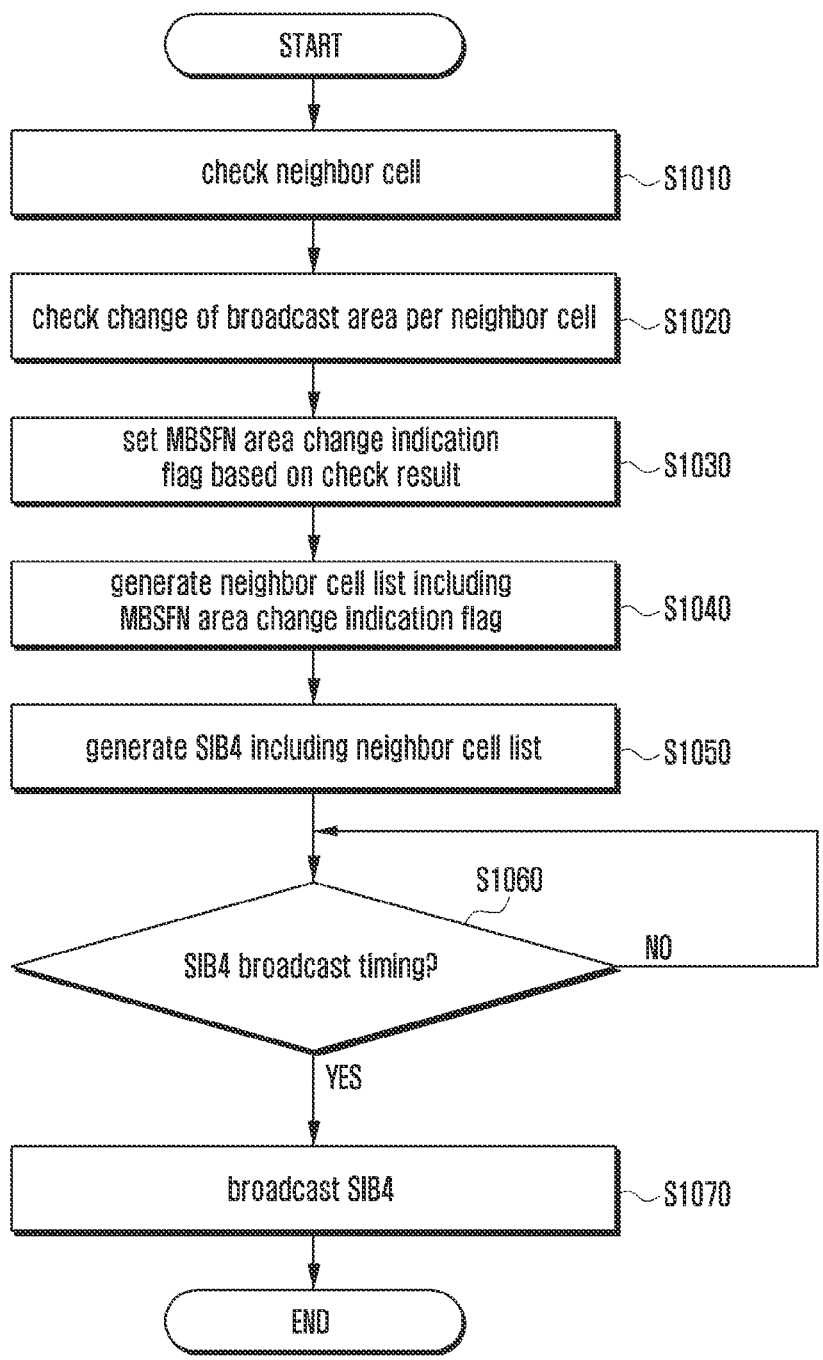
FIG. 10 is a flowchart illustrating a broadcast procedure of an eNB according to the third embodiment of the present disclosure.

FIG. 10 is a flowchart illustrating a broadcast procedure of an eNB according to the third embodiment of the present disclosure.

The eNB checks its neighbor cells at operation S1010. Then the eNB determines whether the broadcast area of each neighbor cell is different from its broadcast area at operation S1020.

The eNB sets the MBSFN area change indication flag according to the determination result at operation S1030. Next, the eNB generates a neighbor cell list including the MBSFN area change indication flag at operation S1040. The eNB generates SIB 4 including the neighbor cell list at operation S1050.

The eNB determines whether it is timing of broadcasting the SIB 4 at operation S1060. If it is the timing of broadcasting the SIB 4, the eNB broadcasts the SIB 4 at operation S1070.

Although the description has been directed to the case where the eNB determines per-neighbor cell broadcast area change and generates SIB 4 with the check result, the present disclosure is not limited thereto. For example, the flag may be set by the network operator at the initial eNB deployment or transmitted by the eNB through a certain SIB other than SIB 4.

Figure 11:
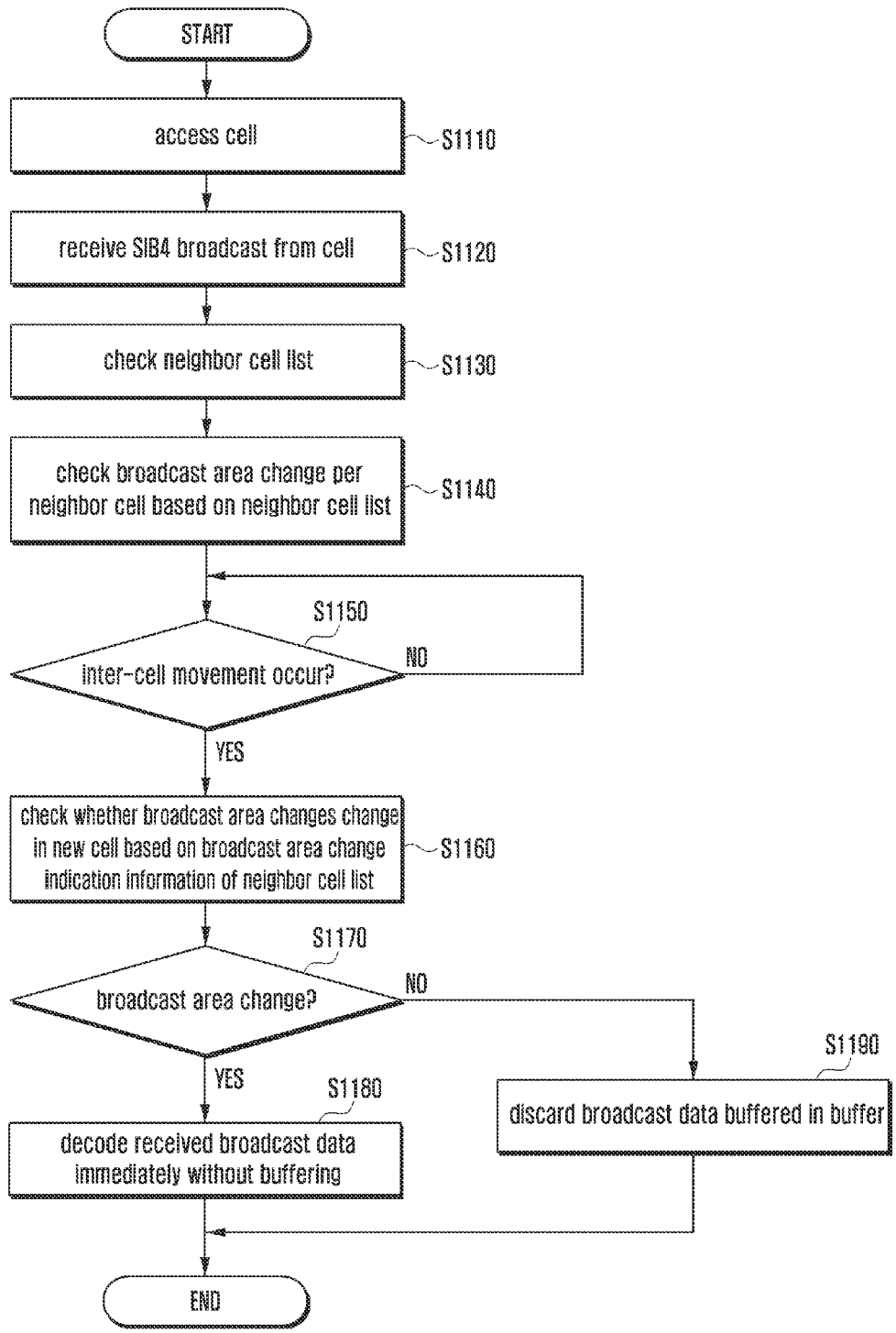
FIG. 11 is a flowchart illustrating a broadcast data handling procedure of a UE according to the third embodiment of the present disclosure.

FIG. 11 is a flowchart illustrating a broadcast data handling procedure of a UE according to the third embodiment of the present disclosure.

First, the UE accesses a cell at operation S1110. Then the UE receives SIB 4 broadcast by the accessed cell at operation S1120.

The UE checks the neighbor cell list included in the SIB 4 at operation S1130. The neighbor cell list may include the information on at least one neighbor cell as shown in Tables 5 and 6. According to an embodiment of the present disclosure, the neighbor cell list may include per-neighbor cell MBSFN area change indication flags. At operation S1140, the UE checks broadcast area change per neighbor cell based on neighbor cell list.

The UE determines whether inter-cell movement has occurred at operation S1150. At operation S1160, the UE determines whether the broadcast area of the new cell is identical with that of the old cell based on the check result at operation S1140. That is, the UE may check in advance whether when attempting to access one of the neighbor cells the cell belongs to the same broadcast area as the accessed cell based on the SIB 4. Accordingly, when it moves from one cell to another, the UE can determine the action to take based on the check result.

The UE determines whether the broadcast area of the new cell is identical with that of the old cell at operation S1170. If the broadcast areas are identical with each other, the UE decodes the received broadcast data immediately without buffering at operation S1180.

If the broadcast areas are not identical with each other, the UE discards the broadcast data buffered in the buffer at operation S1190. Afterward, the UE prepares for receiving the broadcast data in the new broadcast area. Since the preparation process is out of the scope of the present disclosure, detailed description thereof is omitted herein.

The fourth embodiment of the present disclosure is described hereinafter.

In the fourth embodiment of the present disclosure, the broadcast area identify information (MBSFN-AreaId) is added to SIB 15 as shown in Table 7 such that the UE is capable of determining whether the broadcast area has changed. In this case, the SIB 15 message has to be transmitted at an interval of 80 ms or 160 ms.

In more detail, a cell may be configured with a plurality of broadcast area identify information in LTE-advanced (LTE-A). For example, a cell may be configured with three broadcast area identity informations 0, 1, and 2 for providing different services respectively.

According to the fourth embodiment of the present disclosure, the broadcast area identity information may be generated in the form of a list including at least one broadcast area identity information per cell. For example, if the broadcast area identity information list includes 0, 2, and 3, a plurality of services corresponding to broadcast areas 0, 2, and 3 in the corresponding cell.

TABLE 7

Figure 12:
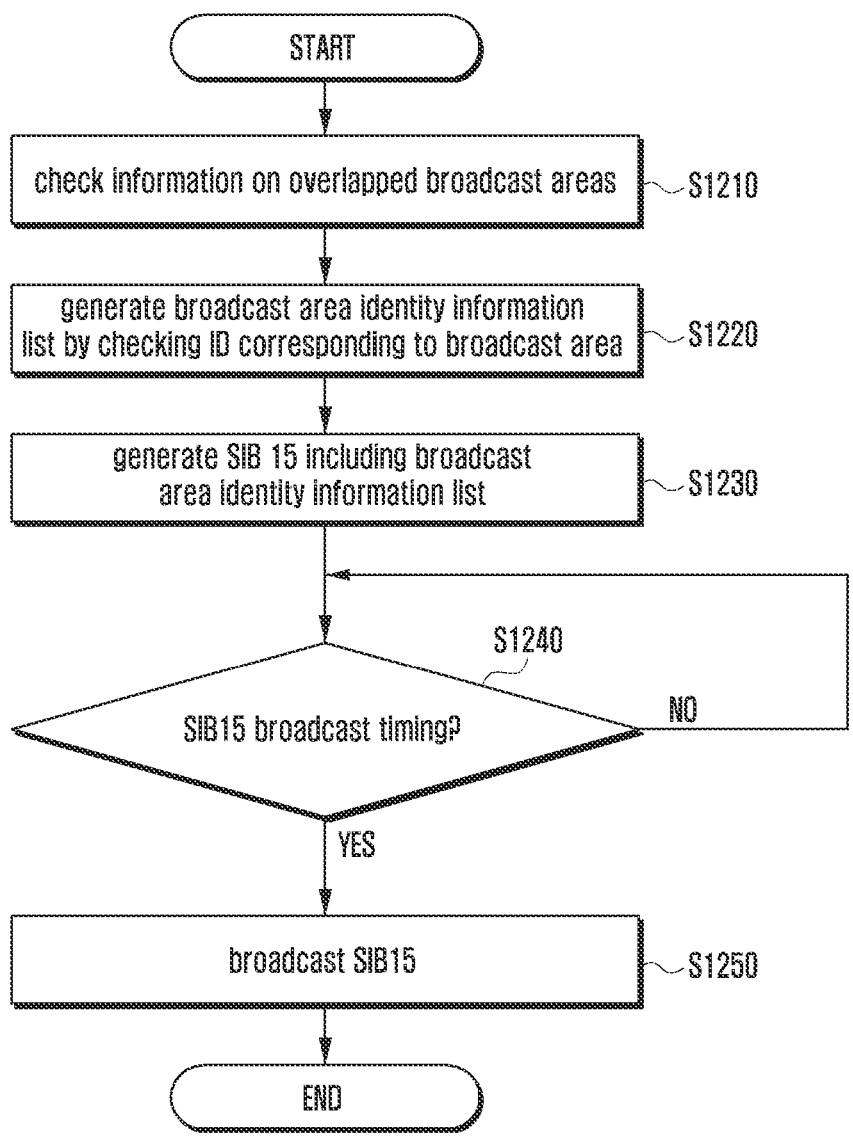
FIG. 12 is a flowchart illustrating a broadcast procedure according to the fourth embodiment of the present disclosure.

-- ASN1START
SystemInformationBlockType15-r11 ::= SEQUENCE {
    mbms-SAI-IntraFreq-r11                    MBMS-SAI-List-r11          OPTIONAL, -- Need OR
    mbms-SAI-InterFreqList-r11               MBMS-SAI-InterFreqList-r11      OPTIONAL, -- Need OR
    lateNonCriticalExtension                 OCTET STRING
        OPTIONAL,
    MBSFN-AreaIdList ::= SEQUENCE (SIZE(1..maxMBSFN-Area)) OF MBSFN-AreaId,
    ...,
    [[    mbms-SAI-InterFreqList-v1140       MBMS-SAI-InterFreqList-v1140 OPTIONAL -- Cond InterFreq
    ]]
}
MBMS-SAI-List-r11 ::=              SEQUENCE (SIZE (1..maxSAI-MBMS-r11)) OF MBMS-SAI-r11
MBMS-SAI-r11 ::=                 INTEGER (0..65535)
MBMS-SAI-InterFreqList-r11 ::=     SEQUENCE (SIZE (1..maxFreq)) OF MBMS-SAI-InterFreq-r11
MBMS-SAI-InterFreqList-v1140 ::=   SEQUENCE (SIZE (1..maxFreq)) OF MBMS-SAI-InterFreq-v1140
MBMS-SAI-InterFreq-r11 ::=         SEQUENCE {
    dl-CarrierFreq-r11                     ARFCN-ValueEUTRA-r9,
    mbms-SAI-List-r11                      MBMS-SAI-List-r11
}
MBMS-SAI-InterFreq-v1140 ::=       SEQUENCE {
        multiBandInfoList-r11
    MultiBandInfoList-r11              OPTIONAL -- Need OR TABLE 7-continued }
MBSFN-AreaId ::= SEQUENCE {
    mbsfn-AreaId-r9 INTEGER (0..255)
}
-- ASN1STOP FIG. 12 is a flowchart illustrating a broadcast procedure according to the fourth embodiment of the present disclosure.

First, the eNB checks the information on the broadcast areas overlapped with its cell at operation S1210. The eNB may check an identity information corresponding to the broadcast area, e.g., MBSFN-AreaId, to generate a broadcast area identity information list at operation S1220. The broadcast area identity information list may include at least one broadcast area identity information item of a cell.

The eNB generates SIB 15 including the broadcast area identity information list at operation S1230. Then the eNB determines whether it is the timing of broadcasting the SIB 15 at operation S1240.

If it is the timing of broadcasting the SIB 15, the eNB broadcasts the SIB 15 at operation S1250.

Figure 13:
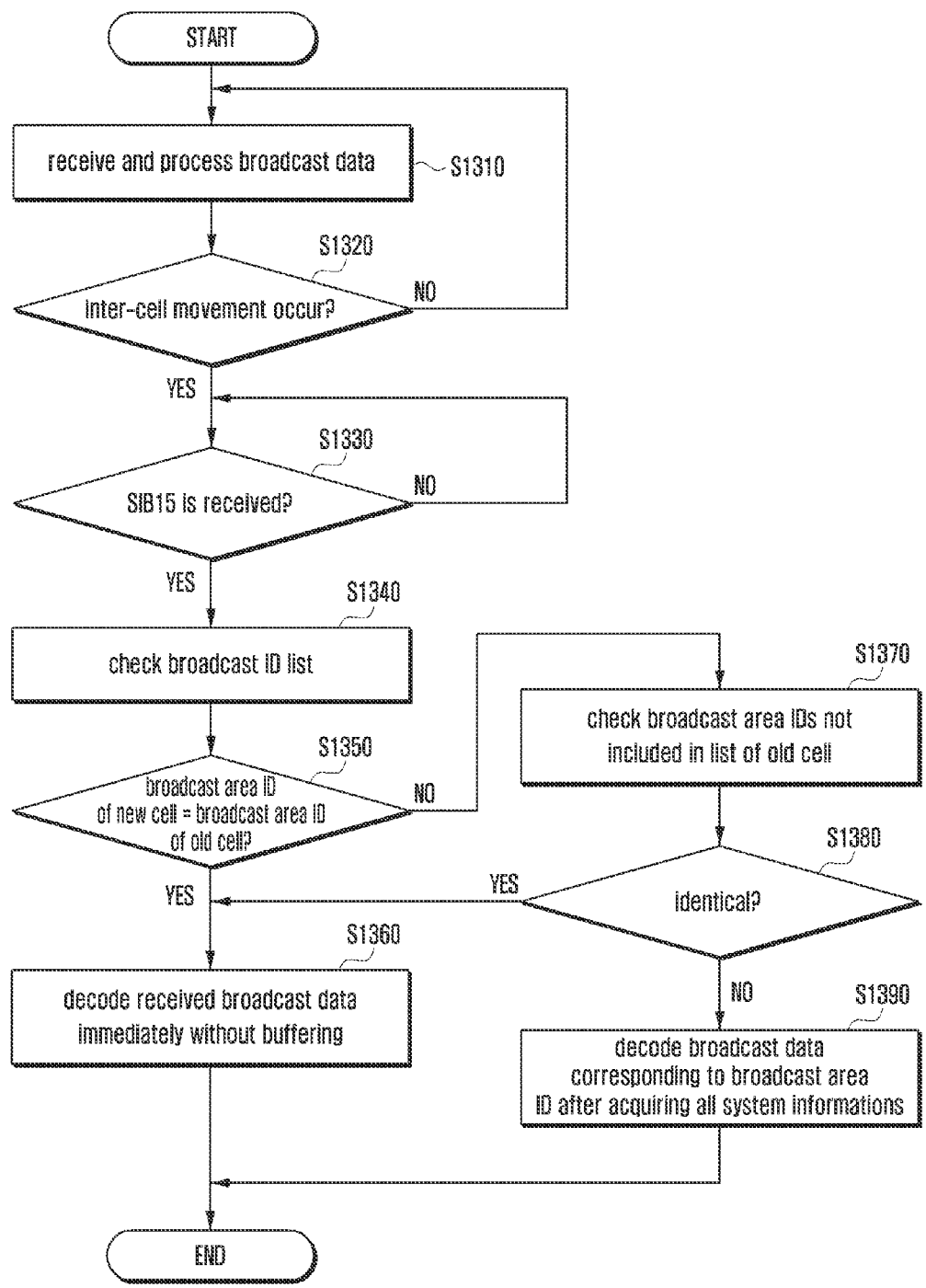
FIG. 13 is a flowchart illustrating a broadcast data handling procedure of a UE according to the fourth embodiment of the present disclosure.

FIG. 13 is a flowchart illustrating a broadcast data handling procedure of a UE according to the fourth embodiment of the present disclosure.

The UE receives and decodes broadcast data to display the decoding result at operation S1310.

The UE determines whether inter-cell movement occurs at operation S1320. If no inter-cell movement has occurred, the UE returns the procedure to operation S1310 to continue the procedure.

If the inter-cell movement has occurred, the UE determines whether SIB 15 is received at operation S1330. If the SIB 15 is received, the UE checks the broadcast area identity information list included in the SIB 15 at operation S1340.

Next, the UE compares the broadcast area identity information lists received from the old and new cells at operation S1350. If all of the broadcast area identity informations included in the broadcast area identity information lists of the old and new cells match each other, the UE decodes the received broadcast data immediately without buffering at operation S1360. For example, if the broadcast area identity information lists received from both the old and new cells consist of the broadcast area identity informations 0, 4, and 5, the UE can decode the received data immediately without buffering.

If the broadcast area identity informations included in the broadcast area identity information lists of the old and new cells mismatch each other, the UE extracts the broadcast area identity informations that are not included in the broadcast area identity information list of the old cell from the broadcast area identity information list of the new cell at operation S1370. For example, if the broadcast area identity information list of the old cell includes broadcast area identity information items 0, 2, and 3 while the broadcast area identity information list of the new cell includes broadcast area identity information items 0, 2, 3, and 4; then the UE distinguishes between the matched information items 0, 2, and 3 and the mismatched information item 4.

The UE determines whether the broadcast area identity informations that are not included in the broadcast area identity information list of the old cell from the broadcast area identity information list of the new cell are identical at operation S1380. If identical, the UE decodes the broadcast data corresponding to the matched broadcast area identity information items without buffering at operation S1360.

Otherwise, for the mismatched broadcast area identity information, the UE acquires all system informations and then decodes the corresponding broadcast data at operation S1390.

Figure 14:
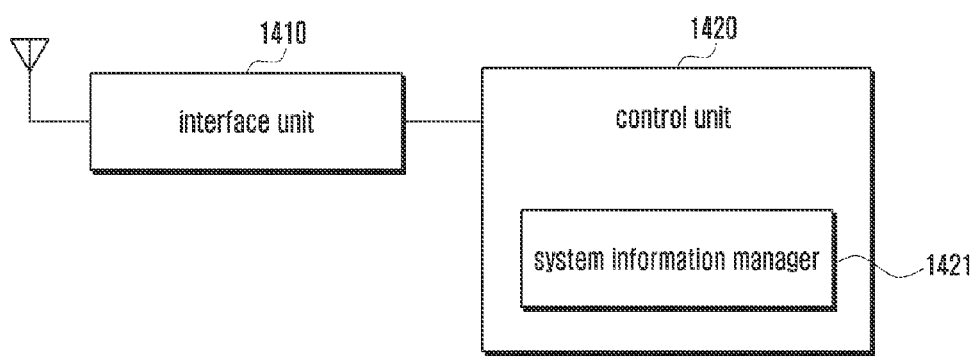
FIG. 14 is a block diagram illustrating a configuration of the eNB according to an embodiment of the present disclosure.

FIG. 14 is a block diagram illustrating a configuration of the eNB according to an embodiment of the present disclosure. Referring to FIG. 14, the eNB includes an interface unit 1410 and a control unit 1420.

The interface unit 1410 is provided with a means capable of communicating signals with a UE or a core node of a wireless communication system. For example, the interface unit 1410 is capable of establishing a radio channel with the UE for communication. The interface unit 1410 also is provided with a wired interface for communication with the core network.

The control unit 1420 controls signal flows among the function blocks such that the eNB operates according to an embodiment of the present disclosure. According to an embodiment of the present disclosure, the control unit 1420 includes a system information manager 1421.

In the following description, the eNB operates under the control of the control unit 1420 or the system information manager.

The operation of the eNB may be executed under the control of one of the control unit 1420 and system information manager 1421.

For example, the control unit 1420 (or the system information manager 1421) generates the system information block including information for use in checking the system area change in the inter-cell movement situation of the UE. The control unit 1420 controls the eNB to broadcast the system information block.

According to the first embodiment of the present disclosure, the information may include the MBSFN Area information. In this case, the system information block is SIB 13 which is identical in transmission period with SIB 2.

According to the second embodiment of the present disclosure, the system information block may be SIB 2. The MBSFN area information may be included in the MBSFN subframe configuration information.

According to the third embodiment of the present disclosure, the information may include the MBSFN area change indication flag indicating whether MBSFN area is changing in the case of moving to the corresponding neighbor cell. In this case, the MBSFN area change indication flag may be included in the neighbor cell list. The neighbor cell list may be broadcast in SIB 4.

According to the fourth embodiment of the present disclosure, the information may include at least one MBSFN area identity information list configured for the eNB.

Figure 15:
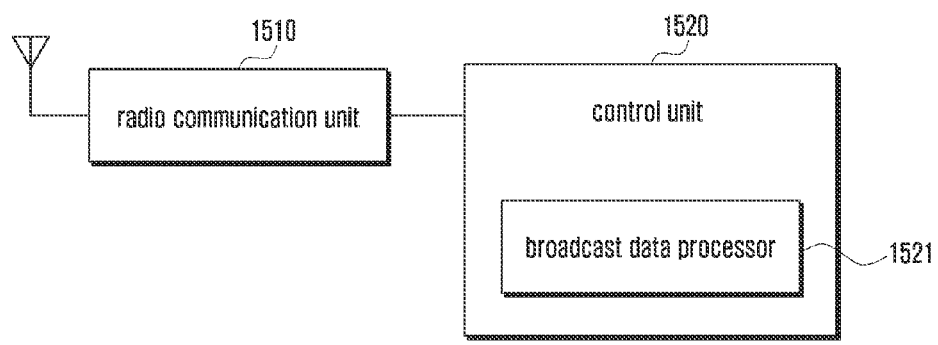
FIG. 15 is a block diagram illustrating a configuration of the UE according to an embodiment of the present disclosure.

FIG. 15 is a block diagram illustrating a configuration of the UE according to an embodiment of the present disclosure. Referring to FIG. 15, the UE includes a radio communication unit 1510 and a control unit 1520.

The radio communication unit 1510 establishes a radio channel with the eNB to transmit/receive signals. According to an embodiment of the present disclosure, the radio communication unit 1510 receives the system information blocks transmitted by the eNB and transfers the system information blocks to the control unit 1520.

The control unit 1520 controls signal flows among the function blocks such that the UE operates according to an embodiment of the present disclosure. In the following description, the UE operates under the control of the control unit 1520 or the broadcast data processor 1521.

For example, the control unit 1520 (or broadcast data processor 1521) receives the system information blocks and determines whether the broadcast area changes when it moves from one cell to another. The control unit 1520 determines whether to decode the broadcast data depending on the determination result.

According to the first embodiment of the present disclosure, the system information block is SIB 13 including MBSFN Area information which is broadcast in the same transmission period as SIB 2.

If it is determined that the MBSFN area is not changed based on the MBSFN area information included in the SIB 13, the control unit 1520 decodes the broadcast data immediately without decoding.

According to the second embodiment of the present disclosure, the system information block is SIB 2 including the MBSFN area information, and the MBSFN area information may be included in the MBSFN subframe configuration information.

If it is determined that the MBSFN area is not changed based on the MBSFN area information included in the SIB 2, the control unit 1520 controls to decode the broadcast data without buffering.

According to the third embodiment of the present disclosure, the system information block may include an MBSFN area change indication flag indicating whether the MBSFN area changes for at least one neighbor cell of the eNB. The MBSFN area change information flag may be included in the neighbor cell list which is broadcast in SIB 4.

The control unit 1520 determines whether the MBSFN area of the new cell is identical with that of the old cell based on the MBSFN area change indication flag and, if so, controls to decode the broadcast data immediately without buffering.

According to the fourth embodiment of the present disclosure, the system information block may be SIB 15 including a list of at least one MB SFN area identity information items configured for the eNB to which the UE is connected.

According to an embodiment of the present disclosure, the UE decodes the broadcast data immediately without buffering when it moves to a new cell of which broadcast area is identical with that of the old cell. Accordingly, even when the UE which is receiving the MBMS broadcast data moves to another cell, it can continue receiving the MBMS broadcast data seamlessly.

As described above, The MBMS data reception method and apparatus of the present disclosure is advantageous in that when the terminal moves to a cell having the same broadcast area information (identifier) as the previous cell the UE decodes the broadcast data immediately without buffering. Also, the MBMS data reception method of the present disclosure is advantageous in terms of receiving the MBMS data seamlessly even when the UE moves from one cell to another.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An information transmission method of a base station in a wireless communication system, the information transmission method comprising:

generating information for use in determining whether a broadcast area changes due to inter-cell movement of a terminal;

generating a system information block (SIB) including the generated information; and broadcasting the SIB, wherein the information comprises multimedia broadcast multicast service single frequency network (MBSFN) area information and a MBSFN area change indication flag included in a list of neighbor cells indicating whether a MBSFN is changed per neighbor cell of the base station.

2. The method of claim 1, wherein the SIB is a SIB 13 of which a transmission period is identical with a transmission period of a SIB 2.

3. The method of claim 1, wherein the SIB is a SIB 2, and the MBSFN area information is included in MBSFN subframe configuration information.

4. The method of claim 1, wherein the list of neighbor cells is included in a SIB 4 broadcast by the base station.

5. The method of claim 1, wherein the information comprises a list of MBSFN area identity information configured for the base station, and wherein the MBSFN area identity information list is included in a SIB 15.

6. A broadcast information reception method of a terminal in a wireless communication system, the broadcast information reception method comprising:

receiving a system information block (SIB) from a new cell to which the terminal moves from an old cell;

determining whether a broadcast area changes based on the SIB; and determining whether to decode the broadcast data based on a result of the determination, wherein the SIB comprises information including multimedia broadcast multicast service single frequency network (MBSFN) area information and a MBSFN area change indication flag included in a list of neighbor cells of the new cell indicating whether a MBSFN is changed in the new cell.

7. The method of claim 6, wherein the SIB is a SIB 13 being broadcast at the same transmission period as a SIB 2.

8. The method of claim 7, wherein the determining of whether the broadcast area changes comprises immediately decoding, when it is determined that the MBSFN area is not changed based on the MBSFN area information included in the SIB 13, the broadcast data without buffering.

9. The method of claim 6, wherein the SIB comprises a SIB 2 and a SIB 13 including the MBSFN area change indication flag, wherein the MBSFN area information is included in MBSFN subframe configuration information, and wherein the determining of whether the broadcast area changes comprises immediately decoding, when it is determined that the MBSFN area is not changed based on the MBSFN area information included in the SIB 2, the broadcast data without buffering.

10. The method of claim 6, wherein the MBSFN area change indication flag is included in a neighbor cell list which is included in a SIB broadcast by a base station, and wherein the determining of whether the broadcast area changes comprises:

determining whether the MBSFN area of the new cell is identical to the MBSFN area of the old cell based on the MBSFN area change indication flag; and immediately decoding, when the MBSFN areas are identical to each other, the broadcast data without buffering.

11. The method of claim 6, wherein the SIB is a SIB 15 including a list of MBSFN area identity information configured for a base station to which the terminal is connected.

12. A base station for transmitting information in a wireless communication system, the base station comprising:

a transceiver configured to transmit and receive signals; and at least one processor configured to:

generate information for use in determining whether a broadcast area changes due to inter-cell movement of a terminal, generate a system information block (SIB) including the generated information, and control the transceiver to broadcast the SIB, wherein the information comprises multimedia broadcast multicast service single frequency network (MBSFN) area information and a MBSFN area change indication flag included in a list of neighbor cells indicating whether a MBSFN is changed per neighbor cell of the base station.

13. The base station of claim 12, wherein the SIB is a SIB 13 of which a transmission period is identical with a transmission period of a SIB 2.

14. The base station of claim 12, wherein the system information is a SIB 2, and the MBSFN area information is included in the MBSFN subframe configuration information.

15. The base station of claim 12, wherein the list of the neighbor cells is included in a SIB 4 broadcast by the base station.

16. The base station of claim 12, wherein the information comprises a list of MBSFN area identity information configured for the base station, and wherein the MBSFN area identity information list is included in a SIB 15.

17. A terminal for receiving broadcast information in a wireless communication system, the terminal comprising:

a transceiver configured to transmit and receive signals to and from a base station; and at least one processor configured to:

control the transceiver to receive a system information block (SIB) from a new cell to which the terminal moves from an old cell, determine whether a broadcast area changes based on the SIB, and determine whether to decode broadcast data based on a result of the determination, wherein the SIB comprises information including multimedia broadcast multicast service single frequency network (MBSFN) area information and a MBSFN area change indication flag included in a list of neighbor cells of the new cell indicating whether a MBSFN is changed in the new cell.

18. The terminal of claim 17, wherein the SIB is a SIB 13 being broadcast at the same transmission period as a SIB 2.

19. The terminal of claim 18, wherein the at least one processor is further configured to immediately decode, when it is determined that the MBSFN area is not changed based on the MBSFN area information included in the SIB 13, the broadcast data without buffering.

20. The terminal of claim 17,
wherein the SIB comprises a SIB 2 and a SIB 13 including the MBSFN area information which is included in MBSFN subframe configuration information, and
wherein the at least one processor is further configured to immediately decode, when it is determined that the MBSFN area is not changed based on the MBSFN area information included in the SIB 2, the broadcast data without buffering.

21. The terminal of claim 17, wherein the MBSFN area change indication flag is included in a neighbor cell list which is included in a SIB 4 broadcast by the base station, and
wherein the at least one processor is further configured to determine whether the MBSFN area of the new cell is identical with the MBSFN area of the old cell based on the MBSFN area change indication flag and immediately decodes, when the MBSFN areas are identical with each other, the broadcast data without buffering.

22. The method of claim 17, wherein the SIB is SIB 15 including a list of MBSFN area identity information configured for the base station to which the terminal is connected.

\* \* \* \* \*